United States Patent [19]

Refregier et al.

[11] Patent Number: 5,058,973
[45] Date of Patent: Oct. 22, 1991

[54] DEVICE FOR READING BY OPTICAL SENSOR COHERENCE

[75] Inventors: Philippe Refregier, Gif-sur-Yvette; Dominique Rojas, Arcueil; Marc Turpin, Bure-sur-Yvette, all of France

[73] Assignee: Thomson-CSF, Puteaux, France

[21] Appl. No.: 477,810

[22] PCT Filed: Jul. 6, 1989

[86] PCT No.: PCT/FR89/00353
§ 371 Date: Feb. 27, 1990
§ 102(e) Date: Feb. 27, 1990

[87] PCT Pub. No.: WO90/00721
PCT Pub. Date: Jan. 25, 1990

[30] Foreign Application Priority Data

Jul. 8, 1988 [FR] France ................. 88 09300

[51] Int. Cl.⁵ ................. G01B 9/02
[52] U.S. Cl. ................. 385/27; 250/227.12; 333/144; 372/700; 359/577; 385/12
[58] Field of Search ........ 356/345, 349, 351; 250/227.12; 350/96.11, 96.12, 96.13, 163, 96.14; 333/142, 143, 144; 372/700

[56] References Cited

U.S. PATENT DOCUMENTS

| | | | |
|---|---|---|---|
| 4,627,731 | 12/1986 | Waters et al. | 356/349 |
| 4,697,926 | 10/1987 | Youngquist et al. | 356/349 |
| 4,699,513 | 10/1987 | Brooks et al. | 356/349 |
| 4,765,738 | 8/1988 | Henmi | 356/349 |
| 4,798,467 | 1/1989 | Wyeth et al. | 356/349 |
| 4,940,331 | 7/1990 | Wyeth et al. | 356/349 |

FOREIGN PATENT DOCUMENTS

| | | |
|---|---|---|
| 0191589 | 8/1986 | European Pat. Off. |
| 0251632 | 1/1988 | European Pat. Off. |
| 56-111415 | 9/1981 | Japan |

OTHER PUBLICATIONS

Blotekjaer et al., "Choosing Relative Optical Path Delays in Series-Topology Interferrometric Sensor Arrays," *Journal of Lightwave Technology*, vol. LT-5, No. 2, Feb. 1987, pp. 229-235.

Primary Examiner—Rodney B. Bovernick
Assistant Examiner—Martin Lerner
Attorney, Agent, or Firm—Oblon, Spivak, McClelland, Maier & Neustadt

[57] ABSTRACT

A reading device operates by the placing in interference of a reference signal, in the form of a fundamental wave train, with delayed wave trains constituting the useful signal. The device comprises an interferometer, a first branch (32) of which is traversed by at least said fundamental wave train (14), the first branch (32) being equipped, with means (37, 67, 87) for the generation of quantified delays of said fundamental wave train (14) with means (39) for the generation of a continuously variable delay of said fundamental wave train (14) over a range about each quantified delay value.

18 Claims, 5 Drawing Sheets

DEVICE FOR READING BY OPTICAL SENSOR COHERENCE

BACKGROUND OF THE INVENTION

The invention relates to a device intended for the analysis and for the reading of an optical signal of the type which can be analysed as at least one fundamental wave train associated with a set of secondary wave trains, which emanate from said fundamental train and which exhibit a set of corresponding delays in relation to said fundamental wave train.

The general principle of reading information comprises delaying a reference signal, namely, for example, the fundamental wave train, in order to cause an interference of said reference signal with the signals containing the information to be analysed, namely, for example, each one of said secondary wave trains.

Said information to be analysed may be, for example, the distance between the wave trains or alternatively the amplitude of the secondary wave trains.

This type of signal is, for example, obtained at the exit of a monomode fiber with maintenance of polarization, which is associated with a linearly polarized source 11 of broad spectrum (or a source emitting a beam which is linearly polarized outside the source), the fiber comprising points of coupling 12 between the two birefringent axes (FIG. 1). The optical sensor per se is constituted by the fiber section comprising the points of coupling 12, and may be either intrinsic (that is to say the fiber itself) or extrinsic (in the form of an external element).

The points of coupling 12 are, for example, constituted by the introduction of a slight shift in rotation of the axes of birefringence within the fibre, at each point $c_1, c_2, \ldots c_n$. Each one of these shifts, which are, in general, small in order to avoid multiple couplings, introduces a perturbation of the polarized fundamental wave train 13 emitted by the source 11. Each perturbation thus generates a secondary wave train 15 in polarization orthogonal in relation to the fundamental wave train 13–14. In other words, assuming the entrance wave train 13 coupled in the fast mode, there is recovered at the exit:

a fundamental wave train $TO_f$ 13, which has remained in the fast mode, and of amplitude $e_f$; and a series of secondary wave trains $TO_i$ 15, which are coupled in the slow mode, and of amplitude $e_i$.

It is then possible to project all the wave trains 14–15 in the same state of polarization, by means, for example, of a polarizer at 45° on the axes of birefringence.

Such a sensor with multiple points of coupling 12 may, for example, be used as continuous temperature probe, by utilizing the heat-sensitive properties of the propagation velocity differential between the two axes of birefringence of the optical fiber. In this case, the analysis and the reading of the signal received from the sensor consists in measuring the effective delay of each secondary wave train 15 in relation to the exit fundamental wave train 14. In a known manner, such a reading is undertaken by retarding the fundamental signal in the reading device, until detection of its interference with each one of the secondary wave trains. The value of the delay which is read permits the calculation of the temperature, after calibration of the device.

In a known manner, the means which is simplest (at least conceptually) for performing such a reading consists in using a Michelson interferometer which can be scanned, in order to induce the delay which is necessary in order that the fundamental wave train should be able to interfere with the wave trains $TO_i$.

However, if consideration is given to a sensor comprising 100 points of coupling which are distributed with an interval of 10 m between each coupling and a fiber the birefringence of which is $5 \cdot 10^{-4}$, the scanning of the interferometer must be 50 cm. Having regard to the necessary mechanical precision, such a scanning range involves a relatively low reading frequency and a limited flexibility of use: the reading can be only with sequential access (wave train N1, then N2, then N3 etc . . . ).

A second method which is suitable for this type of device would consist in processing the various wave trains in parallel (FIG. 2a). However, in this case, the number of detectors must be of the order of the number of couplings. In order to alleviate this disadvantage, it is possible to use active couplers. In this case again, the number of couplers must be of the order of the number of points of couplings (typically approximately 100), irrespective of the parallel or series structure adopted.

Furthermore, the series structure (FIG. 2b) exhibits the disadvantage of attenuating (on account of the repeated passages within the couplers which are switchable if, for example, they are of integrated-optics type) the secondary wave trains $TO_i$; this accordingly degrades the signal-to-noise ratio.

SUMMARY OF THE INVENTION

The object of the device according to the invention is to alleviate these various disadvantages.

More specifically, a first object of the invention is to provide a device for reading by optical sensor coherence, which performs a processing of the signal to be analysed without degrading the signal-to-noise ratio.

Reading by coherence is taken to refer essentially to the principle consisting in causing the interference of the fundamental and secondary wave trains.

A second object of the invention is to provide such a reading device which ensures, on the one hand, a fast scanning of the entire admissible delay range, while still permitting a supplementary fine scanning ensuring an accurate placing in interference and thus an accurate reading of the delays.

Another object of the invention, in a specific embodiment, is to provide a reading device permitting a simultaneous and parallel reading of the various delays of all the secondary wave trains originating from the optical sensor.

These objects, as well as others which will become evident hereinbelow, are achieved by means of a device for reading by optical sensor coherence, of the type supplying a signal to be processed which can be analysed as at least one fundamental wave train associated with a set of secondary wave trains which emanate from said fundamental wave train and exhibiting a set of corresponding delays in relation to said fundamental wave train, said device being intended to bring said fundamental wave train into interference with each one of said secondary wave trains, characterized in that it comprises an interferometer, a first branch of which is traversed by at least said fundamental wave train, and a second branch of which is traversed by at least said secondary wave train, and in that said first branch with a delay is equipped, on the one hand, with means for the generation of quantified delays of said fundamental wave train, and, on the other hand, with means for the generation of a delay which is continuously variable over a range about each quantified delay value.

The interferometer may be a Mach Zehnder or Michelson interferometer, or any other type of interferometer.

Such a device exhibits the advantage that the signal-to-noise ratio is only very slightly degraded on account of the fact that the asymmetric structure of the interferometer, for example a Mach Zehnder interferometer, involves the attenuation of only the amplitude of the fundamental wave train, which alone constitutes the useful signal traversing the delay branch of the interferometer. The "useful" secondary wave trains, which come into interference with the delayed fundamental wave train, do themselves traverse the branch of the interferometer which includes no optical elements.

In an advantageous embodiment of the invention, the means for the generation of quantified delays are constituted by a set of elementary delay lines, which are placed in series on said delay branch of the interferometer, each one of said means for the generation of quantified delays being selectively switchable into said branch in such a manner as to supply a combination of quantified values of delays by combination of the elementary lines which are simultaneously and selectively switched.

In another embodiment, said means for the generation of quantified delays are associated with means for the frequency shifting of the delayed signal, in such a manner that each delay value corresponds to a specific frequency shift. Said means for the generation of quantified delays are preferably constituted by a set of elementary delay lines which are consecutive and each coupled in parallel to said delay branch of the interferometer, in such a manner as to supply simultaneously a combination of quantified values of delays, which values are each associated with a specific frequency shift, by linear combination of the optical paths followed by the delayed signal.

In both embodiments, it is advantageous to use elementary delay lines exhibiting delay values which are distributed in accordance with a geometric progression. This permits, for example, the generation of $2^n$ delays from n basic delays, by considering the linear combinations of these n basic delays.

In a variant of construction of the second embodiment, the means of the generation of the quantified delays are constituted by a delay and frequency-shift line coupled in parallel and in feedback to said delay branch of the interferometer.

BRIEF DESCRIPTION OF THE DRAWINGS

Other features and advantages of the invention will become evident on reading the description, which follows, of certain embodiments of the invention, which are given by way of illustration, and the accompanying drawings, in which.

DETAILED DESCRIPTION OF THE PREFERRED EMBODIMENTS

Figure 1:
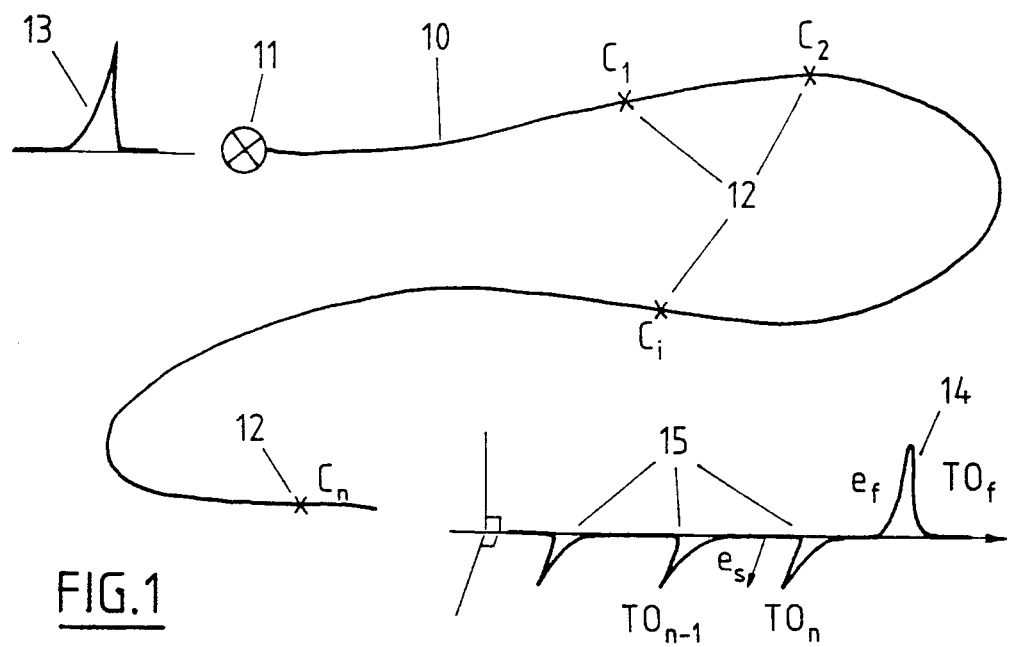
FIG. 1 diagrammatically represents the configuration of an optical sensor with multiplexing by coherence, of the type associated with the reading device according to the invention.
Figure 2A:
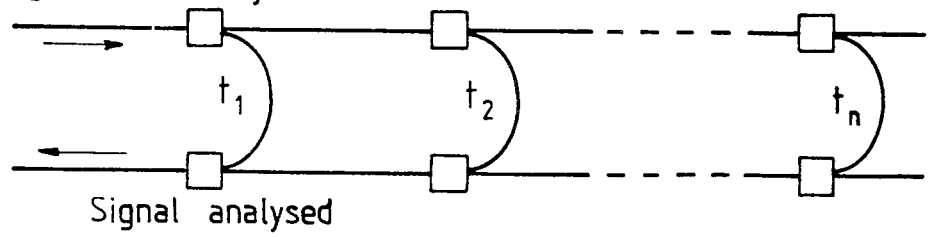
FIGS. 2a and 2b illustrate two structures which are possible, but unfavourable, of parallel and serial processing respectively of the set of secondary wave trains of the signal analysed.
Figure 2B:
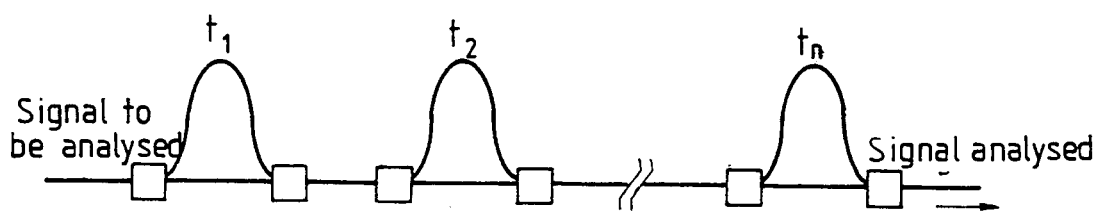
Figure 3:
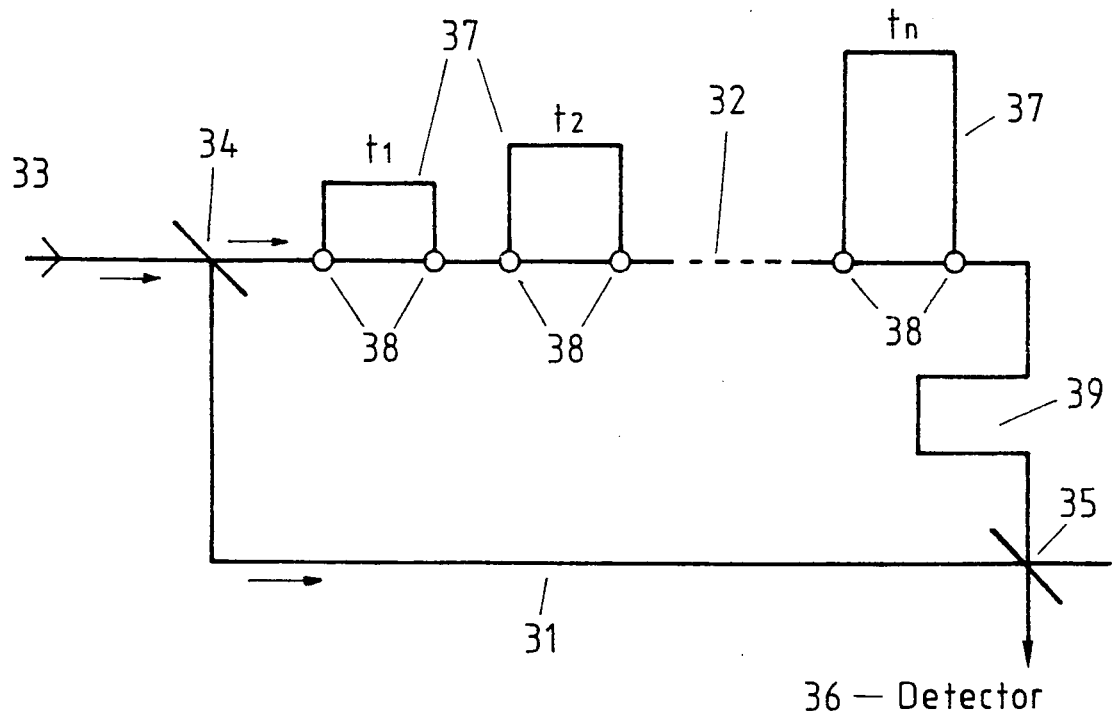
FIG. 3 diagrammatically represents the first embodiment of the reading device according to the invention, with elementary delay lines which are selectively switchable.

As represented in FIG. 3, the reading device according to the invention comprises an interferometer, in the present case a Mach Zehnder interferometer, of which:

the first arm 31 contains the signal to be analysed, the second arm 32 generates delays, in a discrete manner, on the referenced signal, in order to permit interference with the various signals to be analysed.

The source signal to be analysed 33 is divided between the two arms 31, 32 of the Mach Zehnder interferometer by means of a separator 34. An optical component 35 is mounted at the exit of the two arms 31–32, in order to superimpose the secondary wave trains to be analysed as well as the delayed fundamental wave train, towards the detector system 36.

The delay arm 32 comprises elementary delay lines 37, which are selectively switchable into the arm. Switching means 38 ensure selectively, for each elementary delay line 37, either the orientation of the signal in the elementary line or its shunting. These switching means 38 may be, for example, constituted by liquid crystal switches, or preferably integrated optical switches as described in the document: "L'optique guidée monomode et ses applications", [The monomode guided optical system and its applications], published in 1985 at Editions Masson. Any switching means providing the corresponding function is equally appropriate.

In an advantageous manner, the elementary delay lines 37 are distributed in accordance with a geometric progression of the delays.

By way of example, in the case where the delays of the various secondary wave trains are integral multiples of an elementary delay, which corresponds to the case where all the sensors measure the same signal, the succession of the delays to be induced is: $t1=t$; $t2=2t$; $t3=4$; ...; $tn=2^{n-1}t$.

With such a distribution of the delay values of the elementary lines 37, it is thus possible to generate $2^n$ delays from n lines 37 in accordance with the following operating pattern:

| Delays activated | Total delay |
|---|---|
| none | 0 |
| t1 | t |
| t2 | 2t |
| t1 + t2 | 3t |
| t3 | 4t |

Once the principal delays have been induced, it is sufficient to arrange in series (inside or outside the arms) a means for the generation of a variable delay 39 in order to explore a continuous range about the principal delays, which are, by construction, of discrete nature. In order to limit this range of exploration, supplementary discrete delays may be added to the system.

This solution has the merit of limiting the number of optical switches 38 which are necessary (typically of the order of the logarithm of the number of couplings); which gives minimum attenuation of the signal to be analysed, while still permitting a fast exploration of the various couplings in any a priori order.

Figure 6:
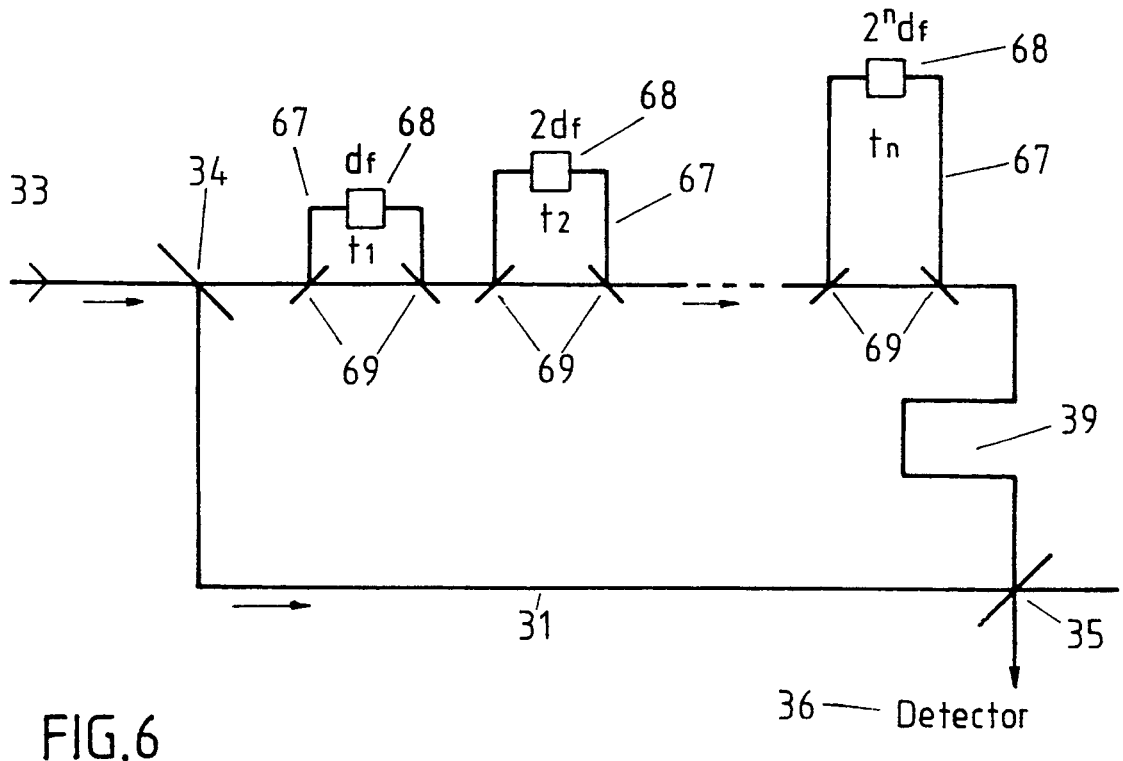
FIG. 6 diagrammatically represents a second embodiment of the reading device according to the invention, with elementary delay and frequency-shift lines which are coupled consecutively, in parallel, on the delay branch of the Mach Zehnder interferometer.

FIG. 6 corresponds to a second embodiment of the reading device according to the invention, in which the delays of the fundamental wave train are generated by elementary delay lines 67 which are each associated with means (68) for the frequency shifting of the delayed signal. In this manner, each delay t is accompanied by a specific frequency shift df of the delayed signal. Each one of the elementary delay lines 67 is coupled in parallel, by means of optical separators 69, on the delay branch 32 of the Mach Zehnder interferometer.

The frequency shifting means 68 are, for example, constituted by a retarder utilizing the Doppler effect or utilizing an acousto-optical crystal, or again by a thermo-optical and/or electro-optical or other phase modulator.

This embodiment permits the performance of a parallel reading of the delays of each one of the secondary wave trains by virtue of a frequency multiplexing of the various delays.

Thus, for the delay t1, the frequency shift must be df; for t2, 2df; for t3, 3df; etc. . . . In this manner, the frequency shift will be different for each one of the linear combinations of the basic delays.

Figure 7:
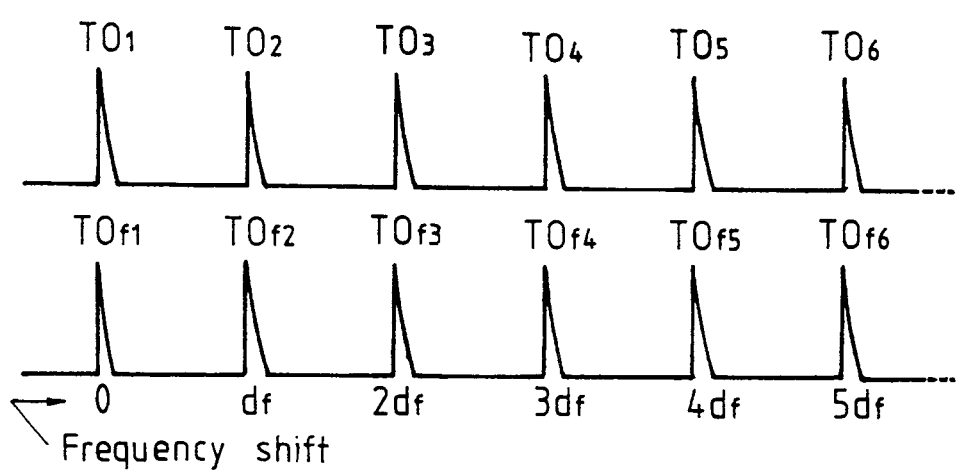
FIG. 7 is a diagram illustrating the operation of the embodiment of FIG. 6.

At the exit of the interferometer there will then be wave trains such as represented in FIG. 7:

the secondary wave trains $TO_i$, originating from the branch 31 of the interferometer, and maintained at the optical frequency f;

the delayed fundamental wave trains $TO_{fi}$, which have undergone the various delays, as well as the corresponding frequency shifts.

Each interference pair ($TO_i$, $TO_{fi}$) is therefore at a specific shifted frequency (i-1) df. An analysis in Fourier series therefore permits the demultiplexing of the various interferences.

In the particular case where the succession of the delays being induced is the following: t, 2t, 3t, 4t, etc . . . , the following table illustrates the combinations of elementary delay lines permitting the obtaining of each one of the quantified delays 0, t, 2t, 3t, 4t, etc, and the corresponding frequency shifts df, 2 df, 3 df, 4 df, . . .

| Activated delays | Total delay | Frequency shift |
|---|---|---|
| 0 | 0 | 0 |
| t1 | t | df |
| t2 | 2t | 2df |
| t1 + t2 | 3t | 3df |
| t3 | 4t | 4df |

Figure 8:
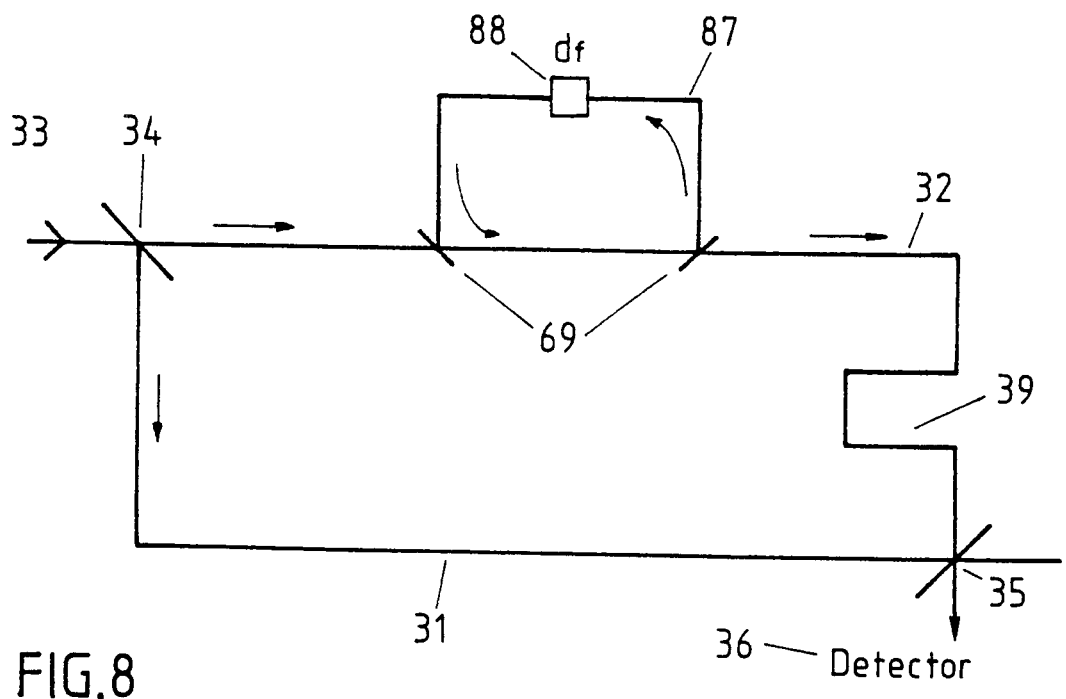
FIG. 8 illustrates a variant of the embodiment of FIG. 6, with a single elementary delay line, which is coupled in parallel and in rear feedback on the delay branch of the Mach Zehnder interferometer.

FIG. 8 illustrates a compact version of the embodiment with quantified delay and frequency shift. In this embodiment, a single elementary delay line 87 is connected in parallel and in rear feedback to the delay branch 32 of the interferometer. A frequency shift df 88 is generated at each traverse of the line 87.

Figure 9:
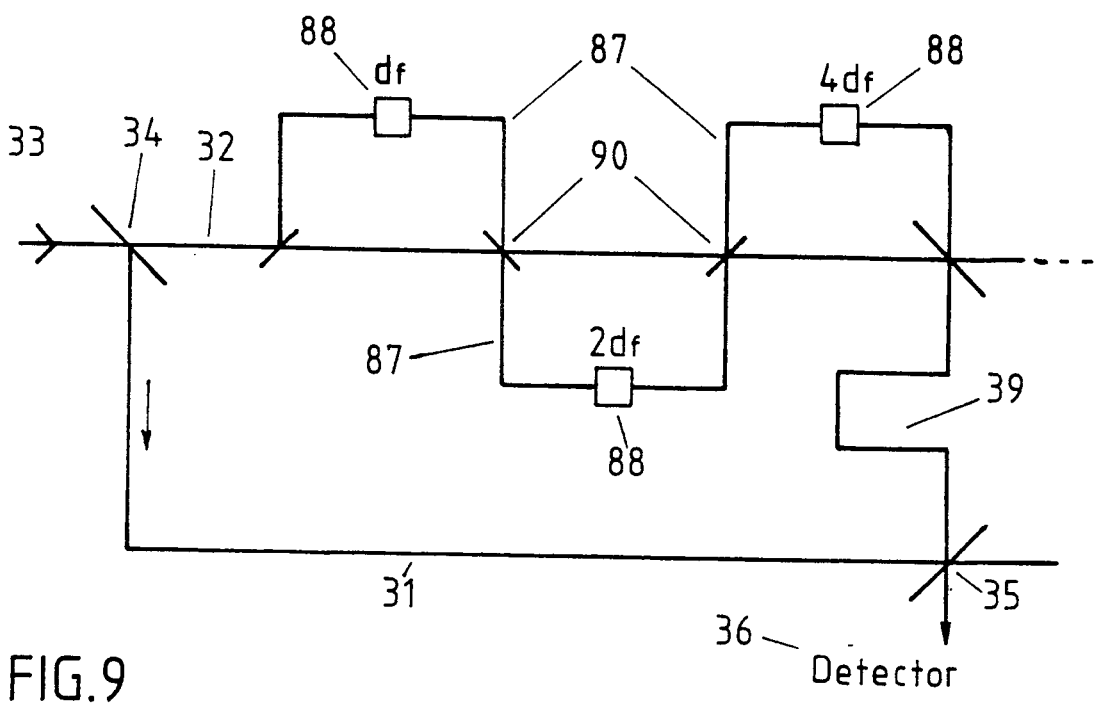
FIG. 9 illustrates a second variant of the embodiment of FIG. 6, with separators of minimum loss.

In the embodiment of FIG. 9, the elementary delay lines 87 are connected to the separating means 90 having two inputs and two outputs, permitting the ensuring of a minimum loss, and thus an optimal energy balance in the delay branch 32.

In a variant of the embodiment of FIG. 3, it may be beneficial to replace the whole or part of the switches 38 by passive couplers, for example 50/50 separators, ensuring a division of the signal between the delay branch 32 and the elementary delay lines 37. The use of a plurality of passive couplers permits the multiplication of the number of fundamental wave trains, since a plurality of elementary delay lines 37 operate simultaneously. If the delay between these wave trains is different from the delays which separate the wave trains due to the couplings ($TO_i$), the measurement remains possible.

Figure 4:
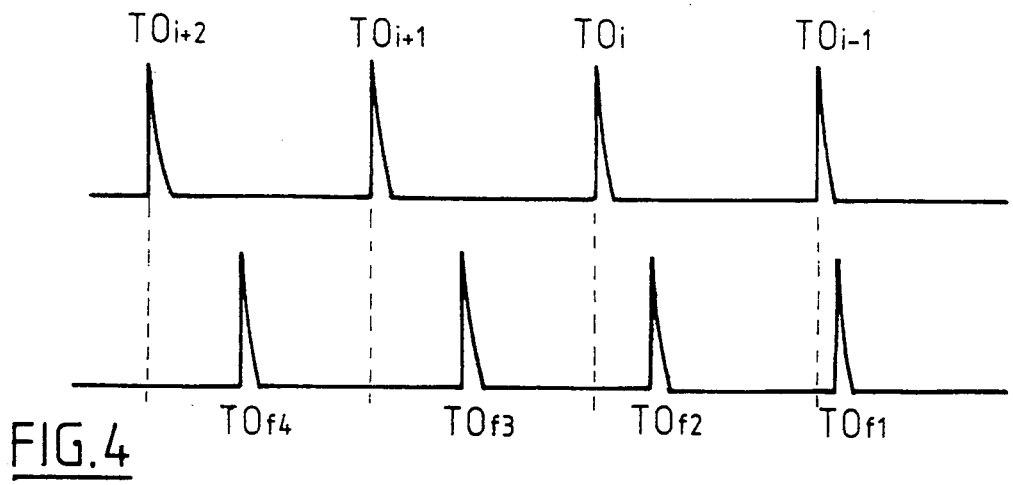
FIGS. 4 and 5 are diagrams illustrating a variant of application of the reading device according to the invention to optical signals incorporating a plurality of fundamental wave trains, permitting either the limitation of the number of active elements or the range of exploration respectively.
Figure 5:
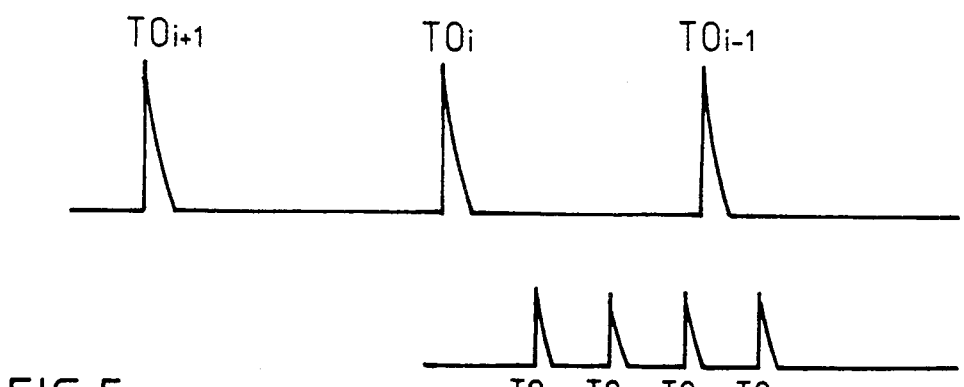

This option may be adapted for two different objectives:

to limit the number of active elements. In this case, the principle of operation is illustrated in FIG. 4, for four fundamental wave trains. The reading is then undertaken in the manner of a vernier, by bringing each one of the secondary wave trains $TO_i$ into interference with the closest fundamental wave train. Thus, the reading of $TO_{i-1}$ is carried out by causing this wave train to interfere with $TO_{f1}$, the other wave trains ($TO_{f2}$, $TO_{f3}$, $TO_{f4}$) not being in coincidence with the wave trains TOi and so on.

to limit the range of exploration, as illustrated in FIG. 5. This embodiment assumes that the delay branch 32 of the interferometer of FIG. 3 is equipped, on the one hand, with elementary delay lines incorporating passive couplers (for the generation of a plurality of fundamental wave trains) and, on the other hand, with elementary delay lines incorporating switches (for the fast scanning, by discrete delays, of the entire reading field). Thus, the $TO_{fi}$ values may be of differing amplitude, in order to discern with what wave train $TO_i$ interferes.

The reading device according to the invention is particularly attractive on account of the fiber sensors, by reason of the possibility of constructing it as "all fiber":

the switches may be of the "integrated optics" type and/or liquid dielectric switches as described in the French Patent Application 8310914 ("electrically controllable device for displacement of fluid");

the frequency shifting systems of the second embodiment of FIG. 6 may be constituted by phase modulators, of piezo-optical, acousto-optical or integrated-optics type;

the means for the generation of a variable delay 39 may be constructed, for example, in the form of a fiber surrounded by a conductive sheath. By causing a current to circulate within the sheath, it is thus possible to heat the fiber and to cause the optical path thereof to vary (see "Optical Fiber Thermal Modulator", Lightwave Technology; Vol. LT-5 nx 9, September 1987). Another possibility consists in using an optical fibre wound on a piezoelectric ceramic, in such a manner that on the application of a voltage to the ceramic its diameter varies and gives rise to the variation of the length of the fiber and thus of the optical path.

Figure 10:
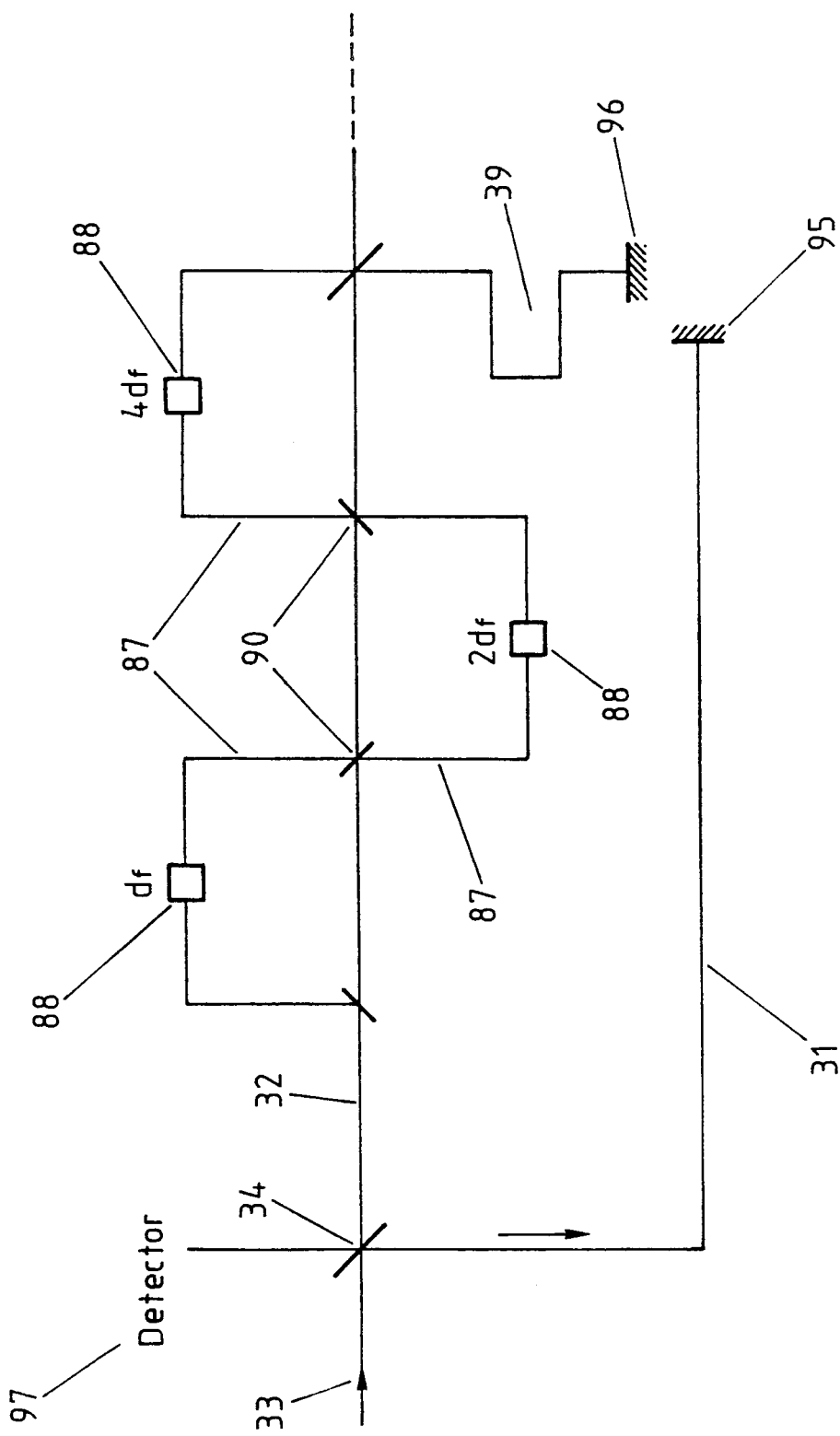
FIG. 10 illustrates a construction of the reading device of the invention in the form of a Michelson interferometer.

FIG. 10 illustrates an embodiment of the device of the invention utilizing an interferometer operating in accordance with the Michelson principle. In this embodiment, the optical signal is deflected, at the end of each one of the two branches 31, 32, by two mirrors 95 and 96. The relected signals are then placed in coincidence at the exit on the separator plate 34, and passed to a detector 97.

It will be noted that the invention is not limited to the utilization of the Mach Zehnder or Michelson interferometer, but extends to any other type of compatible interferometer.

We claim:

1. Device for reading by optical sensor coherence, of the type supplying a signal to be processed which can be analysed as at least one fundamental wave train associated with a set of secondary wave trains which emanate from said fundamental wave train and exhibiting a set of corresponding delays in relation to said fundamental wave train, said device being intended to bring said fundamental wave train into interference with each one of said secondary wave trains, the device comprising an interferometer, a delay branch of which is traversed by at least said fundamental wave train, and a second branch of which is traversed by at least said secondary wave trains, and in that said delay branch is equipped with variable delay means for the generation of variable delays of said fundamental wave train and quantified delay means for the generation of quantified delays of said fundamental wave train, said quantified delay means being selectively switchable into said delay branch by switching means.

2. Device according to claim 1, characterized in that said quantified delay means for the generation of quantified delays are constituted by a set of elementary delay lines, which are placed in series on said delay branch, each one of said elementary delay lines being selectively switchable into said delay branch by said switching means in such a manner as to supply a combination of quantified values of delays by combination of the elementary delay lines which are simultaneously and selectively switched.

3. Device according to claim 2, characterized in that said elementary delay lines have delay values which are distributed in accordance with a geometric progression.

4. Device according to claim 2, characterized in that said switching means for switching said elementary delay lines are liquid crystal switches.

5. Device according to claim 1, characterized in that said quantified delay means for the generation of quantified delays are associated with frequency shifting means for the frequency shifting of the delayed signal, in such a manner that each delay value corresponds to a specific frequency shift value.

6. Device according to claim 5, characterized in that said quantified delay means for the generation of quantified delays are constituted by a set of elementary delay lines, which are consecutive and each coupled in parallel on said delay branch, with said frequency shifting means, in such a manner as to supply simultaneously a combination of quantified values of delays, which values are each associated with a specific freqency shift value by combination of the optical paths followed by the delayed signal.

7. Device according to claim 5, characterized in that said elementary delay lines, as well as the frequency shift means, have delay and frequency shift values respectively which are distributed in accordance with a geometric progression.

8. Device according to claim 5, characterized in that said quantified delay means for the generation of quantified delays comprise a single delay and frequency shift line, which is coupled in parallel and in rear feedback on said delay branch.

9. Device according to claim 5, characterized in that said quantified delay means comprises a set of elementary delay lines having coupling means for coupling said elementary delay lines to said delay branch, said coupling means comprising optical separators intended to divide the signal at each point of coupling.

10. Device according to claim 9, characterized in that said separators have two entrances and two exits of minimum loss, which separators are each inserted into the delay branch between two consecutive elementary delay lines.

11. Device according to claim 5, characterized in that said frequency shifting means belong to the group comprising retarders utilizing the Doppler effect or utilizing an acousto-optical crystal, and thermooptical and/or electro-optical phase modulators.

12. Device according to any one of claims 1 to 11, characterized in that it is associated with a sensor incorporating multiplexing by coherence, of the type constituted by a monomode fibre with maintenance of polarization comprising points of coupling between the two axes of birefringence.

13. Device according to claim 1, characterized in that said interferometer is equipped with means for reading the distance between the wave trains and/or the amplitude of the coupled wave trains.

14. Device according to claim 1, characterized in that said variable delay means (39) for the generation of a variable delay are constituted by a system incorporating a heat-regulated optical fiber.

15. Device according to claim 1, characterized in that said delay branch comprises a set of elementary delay lines connected in series by passive couplers on said delay branch, in such a manner as to supply simultaneously a plurality of fundamental wave trains of distinct delays.

16. Device according to claim 1, characterized in that said interferometer belongs to the group comprising Mach Zehnder and Michelson interferometers.

17. Device according to claim 1, characterized in that said variable delay means for the generation of variable delays of said fundamental wave train comprise means for the generation of a continuously variable delay of said fundamental wave train about each quantified delay value provided by said quantified delay means.

18. Device according to claim 1, characterized in that said means for switching said elementary delay lines are switches constructed in integrated optics.

* * * * *